UNITED STATES PATENT OFFICE 2,161,580

NEUTRALIZATION OF ACID OILS

Marcus T. Kendall, Long Beach, Calif., assignor to The Texas Company, New York, N. Y., a corporation of Delaware No Drawing. Application October 16, 1936,
Serial No. 105,946

4 Claims. (Cl. 196—41)

This invention relates to a process for neutralizing oils, and has to do particularly with the neutralization of acid oils resulting from the acid treatment of hydrocarbon distillates, such as sulfuric acid treated cracked distillates, by means of lime to neutralize the mineral acid acidity.

The acid treatment of oils, such as cracked distillates, with sulfuric acid to improve the color and gum stability, produces an acid oil, after the separation of the sludge, which requires neutralization to remove the undesirable acidity. Caustic soda solution has commonly been used for this purpose because of the ease with which it is handled in continuous operations due to the high solubility of the caustic soda and the salts thereof formed in the neutralization process. Lime has been proposed as a substitute for caustic soda on account of its cheapness but difficulty in its use has been encountered because of mechanical clogging of the pipes, valves, etc. in the treating system. Also ordinary lime water forms emulsions, when uniting with the acid, which carry over into the tanks of finished oil and require excessive time to settle out of the neutralized oil. Moreover, the deposit from the separation of the emulsion, consisting of unused calcium hydrate and calcium sulfate, is a sticky, muddy mass which is difficult to remove from a closed tank and piping system.

In the neutralization of acid oils with lime, it has been customary heretofore to use slaked hydrated lime or suspension of hydrated lime in water, such as milk of lime. It is desirable to use an aqueous suspension of hydrated lime, because of the better contact between the oil and the neutralizing agent and also because of the increased rate of neutralization by such suspension. Relatively concentrated suspensions of slaked lime and water, such as milk of lime or cream of lime, have the disadvantage, however, that they cause troublesome emulsions when contacted with the oil. It is an object of the present invention to provide an aqueous lime reagent which will act as an efficient neutralizing reagent and will readily separate from the neutralized oils.

When lime is slaked or hydrated with excess water, different reaction products are obtained, depending upon the ratio of the calcium oxide to the water. For example, in the preparation of milk of lime, the right proportions of water and quick lime are mixed together to form an almost perfect emulsion. This amount is usually around 480 lbs. of lime to 8000 lbs. of water, whereby about 6% of solids in the emulsion is obtained. Calcium hydrate in such suspensions is almost in a colloidal state. Although this is almost a perfect suspension of lime in water, nevertheless, such a suspension or emulsion is not practical for my purpose, since it tends to emulsify when contacted with acid treated distillates and to carry over with the neutralized oil.

On the other hand, if a deficiency of water is used when slaking the lime, a reaction occurs in which a complex insoluble hydrate is formed. This hydrate is practically insoluble and unsatisfactory for neutralizing acid oils, due to the low concentration of the active calcium hydrate in the water solution.

In accordance with the present invention, a lime suspension is obtained in which the lime remains in relatively large, discrete particles rather than of colloidal dimensions. In order to obtain such a suspension, it is important to properly regulate the ratio of lime to water and quickly wet or drown the lime in the water. A large excess of water is used and the lime quickly wetted, and then this suspension is used immediately for neutralization. The resulting product is granular instead of colloidal, and is easily separated from the neutralized oil and has little tendency to form emulsions therewith.

In preparing the neutralizing solution according to the invention, the amount of water should always be at least 200 times the amount of lime by weight, and, preferably, a much larger ratio of water, for example, about 300 to 400 parts of water, by weight, to one part of lime. Good results have been obtained by using solutions containing one pound of lime per barrel of water, or one pound of lime per 353 pounds of water. I have found that ratios of lime to water within this range are critical and more concentrated suspension tends to emulsify while those more dilute are impractical to handle. A quicklime of approximately 10 mesh is preferred.

The amount of neutralizing agent required will depend upon the nature and acidity of the oil to be neutralized. Sufficient neutralizing agent is used so that a slight excess of lime is present at all times, and one skilled in the art will be able to regulate the quantity by determining the acidity of the oil and calculating the required amount of neutralizing agent, or by controlling the alkalinity in the neutralization liquor so as to maintain a slight excess of calcium hydroxide.

As applied to the neutralization of acid treated cracked distillates, for example, I have used successfully for considerable periods of time neutralization solutions consisting of about one pound of lime to a barrel of water in continuous treaters, without any substantial trouble with emulsions and carry over of neutralizing agent with the finished oil. By quickly drowning the lime in the proper amount of water and immediately using the product, it has been found that upon neutralizing the acid treated distillates an immediate separation takes place between the neutralized oil and spent lime solution. This prompt separation makes the lime practical for commercial use and shows a reduction in cost of 60—70% over caustic soda solution.

The neutralization operation, according to the present invention, is more efficient and more economical in that quick lime, which is cheaper and has approximately 30% more neutralizing value, may be used instead of hydrated lime.

Obviously many modifications and variations of the invention, as hereinbefore set forth, may be made without departing from the spirit and scope thereof, and therefore only such limitations should be imposed as are indicated in the appended claims.

I claim:

1. A continuous process of neutralizing acid treated hydrocarbon oil distillates which comprises quickly suspending finely divided quick lime in 200 to 400 parts by weight of water, then contacting the acid oil with the lime suspension whereby the oil is neutralized, and separating the neutralized oil from the aqueous reagent.

2. In the process of neutralizing acid treated hydrocarbon oil distillates, the steps comprising quickly suspending finely divided quick lime in 200 to 400 parts by weight of water, and then contacting the acid oil with the lime suspension whereby the oil is neutralized.

3. In the process of neutralizing acid treated hydrocarbon oil distillates, the steps comprising quickly suspending quicklime of about 10 mesh in about 350 parts by weight of water, and then contacting the acid oil with the lime suspension whereby the oil is neutralized.

4. In the process of neutralizing acid-treated cracked distillates, the steps comprising quickly suspending finely divided quick lime in 200 to 400 parts by weight of water, and then immediately thereafter contacting the acid cracked distillate with the suspension whereby the oil is neutralized.

MARCUS T. KENDALL.